US008132859B2

(12) United States Patent
Krämer

(10) Patent No.: US 8,132,859 B2
(45) Date of Patent: Mar. 13, 2012

(54) PNEUMATIC SEAT DEVICE

(75) Inventor: Marco Krämer, Wolpertshausen (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 206 days.

(21) Appl. No.: 12/223,159

(22) PCT Filed: Nov. 11, 2006

(86) PCT No.: PCT/EP2006/010829
§ 371 (c)(1),
(2), (4) Date: Jul. 24, 2008

(87) PCT Pub. No.: WO2007/085282
PCT Pub. Date: Aug. 2, 2007

(65) Prior Publication Data
US 2010/0181813 A1   Jul. 22, 2010

(30) Foreign Application Priority Data

Jan. 28, 2006  (DE) .......................... 10 2006 004 071

(51) Int. Cl.
*A47C 7/42* (2006.01)
(52) U.S. Cl. .............................. 297/217.3; 297/452.41
(58) Field of Classification Search ............... 297/217.3, 297/344.16, 284.6
See application file for complete search history.

(56) References Cited

U.S. PATENT DOCUMENTS

| 5,135,282 A * | 8/1992 | Pappers .................... 297/284.3 |
| 5,254,924 A | 10/1993 | Ogasawara |
| 5,873,137 A * | 2/1999 | Yavets-Chen ..................... 5/713 |
| 6,203,105 B1 * | 3/2001 | Rhodes, Jr. ............... 297/284.6 |
| 6,441,576 B1 * | 8/2002 | Marin-Martinod et al. .......................... 318/568.1 |
| 6,523,451 B1 * | 2/2003 | Liao et al. ................... 91/363 R |
| 2002/0070591 A1 | 6/2002 | Nivet |
| 2005/0151410 A1 * | 7/2005 | Sprouse ................... 297/452.41 |
| 2006/0103193 A1 * | 5/2006 | Kramer ..................... 297/217.3 |

FOREIGN PATENT DOCUMENTS

| DE | 33 12 732 C2 | 2/1988 |
| DE | 39 30 612 A1 | 3/1991 |
| DE | 195 22 897 C2 | 7/1998 |
| DE | 198 32 531 A1 | 2/2000 |
| DE | 199 33 769 A1 | 1/2001 |
| DE | 101 62 853 C1 | 6/2003 |
| DE | 197 05 010 B4 | 7/2004 |
| DE | 10 2004 047149 | 4/2006 |

(Continued)

OTHER PUBLICATIONS

PCT International Search Report mailed on Jun. 5, 2007 for the corresponding International patent application No. PCT/EP2006/010829 (English translation enclosed).

(Continued)

*Primary Examiner* — Sarah B McPartlin
(74) *Attorney, Agent, or Firm* — Posz Law Group, PLC

(57) ABSTRACT

A pneumatic seat device, in particular a pneumatic seat device for aircraft, includes at least one pneumatic unit and first and second computer units, whereby an advantageous division of tasks and/or functions within the pneumatic seat device among the individual computing units can be achieved. Primarily, it is thereby possible to obtain effective and fast data processing with use of the two computing units and, consequently, fast control and/or regulation of the pneumatic seat device.

8 Claims, 1 Drawing Sheet

FOREIGN PATENT DOCUMENTS

| | | |
|---|---|---|
| DE | 10 2004 047149 A1 | 4/2006 |
| DE | 10 2004 047165 | 4/2006 |
| DE | 10 2004 047165 A1 | 4/2006 |
| EP | 1 147 938 A1 | 10/2001 |
| GB | 2 168 893 A | 7/1986 |

OTHER PUBLICATIONS

German Search Report mailed on May 15, 2006 for the corresponding German priority application No. DE 10 2006 004 071.6 (German language report enclosed).

* cited by examiner

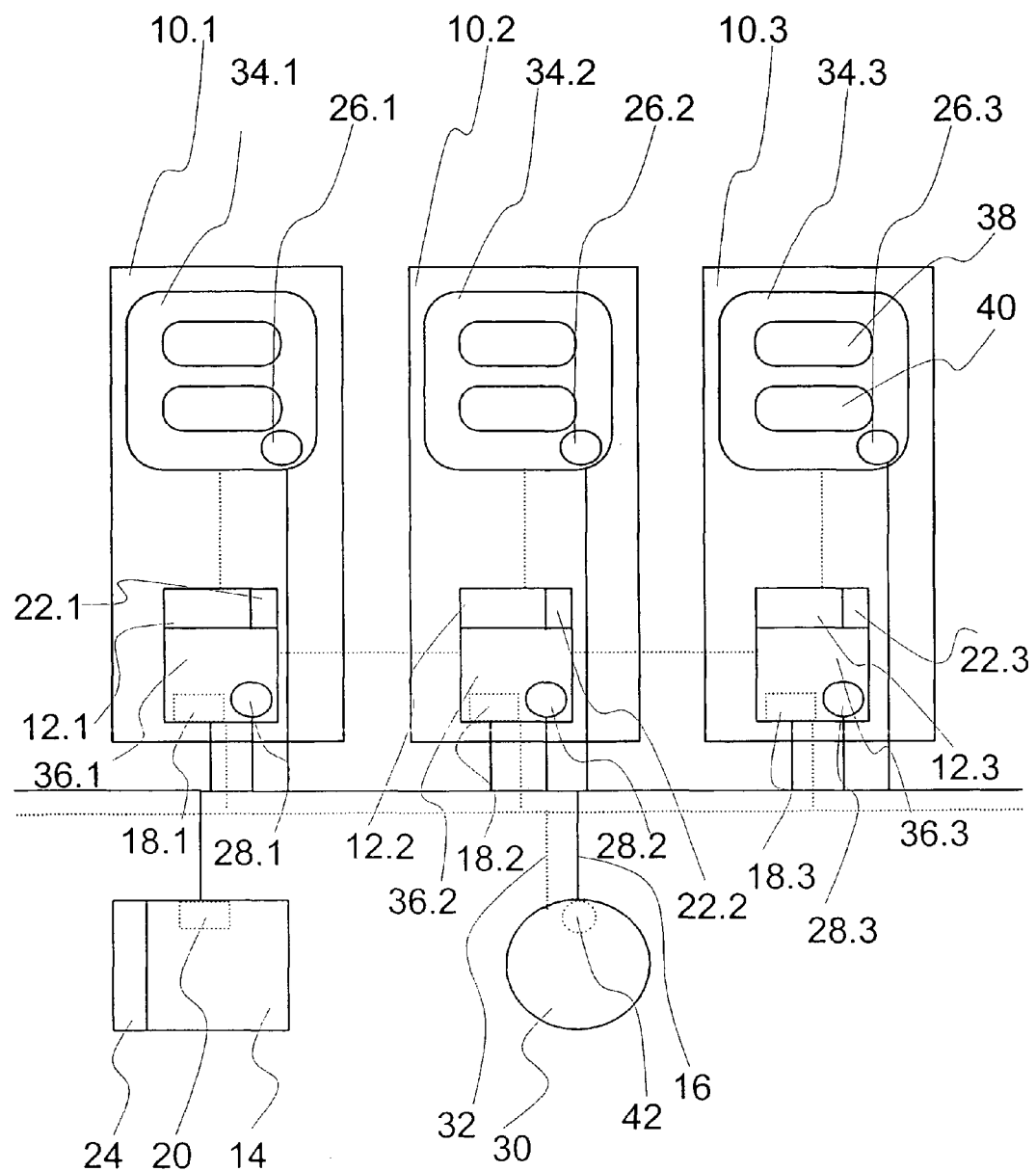

PNEUMATIC SEAT DEVICE

CROSS REFERENCE TO RELATED APPLICATIONS

The present application is a PCT National Stage of PCT Application No. PCT/EP2006/010829, filed on Nov. 11, 2006, and claims priority to and incorporates by reference German Patent Application No. 10 2006 004 071.6, filed on Jan. 28, 2006.

BACKGROUND

The invention relates generally to seat devices, and particularly to a pneumatic seat device.

Pneumatic seat devices having a pneumatic unit and a computing unit are already known. These pneumatic seat devices usually comprise a central sensor unit which is coupled to the computing unit and is provided for pressure detection in the entire pneumatic seat device, which requires long supply lines and results in a long reaction time of the pneumatic seat device.

SUMMARY

Accordingly, it is one object, in particular, to provide a pneumatic seat device having fast and effective data processing.

Accordingly, the invention according to various embodiments is based on a pneumatic seat device, in particular a pneumatic seat device for aircraft, comprising at least one pneumatic unit and at least one first computing unit.

It is proposed that the pneumatic seat device has at least one second computing unit, whereby an advantageous division of tasks and/or functions within the pneumatic seat device among the individual computing units can be achieved. Primarily, it is thereby possible to obtain effective and fast data processing with use of the two computing units and, consequently, fast control and/or regulation of the pneumatic seat device. In this case, a "computing unit" should be understood to mean an evaluation unit, a supervisory unit, a control unit and/or a regulating unit, wherein a computing unit can be formed either by a processor alone or, in particular, by a processor and further electronic components, such as memory means.

It is furthermore proposed that the first and the second computing units are arranged in distributed fashion. It is particularly advantageous in this case if the first and the second computing units are arranged in different pneumatic units, whereby fast regulation and/or control of the individual pneumatic units by the separate computing units can be achieved. In this case, "arranged in distributed fashion" should be understood to mean that the two computing units are arranged, in particular, at a distance from one another and/or in differing housing units.

A further configuration provides for the pneumatic seat device to comprise a data network, whereby a flexible and fast data transfer within the pneumatic seat device can be achieved. Particularly advantageously, it is possible to configure the data transfer by means of a data bus, since the latter enables a simultaneous data transfer in different directions. A "data network" should be understood to mean a device provided for the internetworking of at least two units.

It is particularly advantageous if the data transfer comprises at least one data unit provided for wireless reception and/or for wireless transmission of data, whereby a flexible data transfer, primarily over relatively large distances, can be obtained and simple mounting of the pneumatic seat device can be achieved. A "wireless" transfer of data should be understood primarily to mean a transfer by means of radio signals or a transfer of signals using electromagnetic waves, in particular by means of infrared signals.

It is furthermore proposed that the first and the second computing unit are provided for data exchange via the data network. This arrangement enables a fast and direct data exchange between the individual computing units, such that the tasks and/or functions of the individual computing units can particularly advantageously be coordinated with one another.

The pneumatic seat device advantageously has at least one central computing unit, whereby an expedient division of the tasks among the individual computing units can be achieved. A "central" computing unit should be understood to mean a computing unit which is essentially provided for superordinate tasks concerning the entire system. In particular, in this context a central computing unit is assigned tasks such as, for example, the coordination of individual decentralized computing units with respect to one another. It is particularly advantageous if the central computing unit has a central memory unit, whereby further components, structural space, weight, mounting outlay and costs, in particular in the further computing units, can be saved.

Moreover, it is advantageous if the pneumatic seat is provided with at least two memory units, thereby enabling the computing units to access the memory units rapidly and flexibly, particularly if the memory units are arranged in distributed fashion, in a manner assigned respectively to a computing unit.

A further configuration includes a pneumatic seat device, in particular a pneumatic seat device for aircraft, comprising at least one pneumatic unit and at least one first functional unit for performing a first task, wherein the pneumatic seat device has at least one further functional unit for performing a second task and being able to perform the first task at least in part. An advantageous reliability of a pneumatic seat device can thereby be achieved in that specific functions are subjected to double supervision and/or regulation and/or in that in the event of the failure of one functional unit, the function thereof can be undertaken by the other functional unit. By way of example, the two functional units can be formed by pumps within the pneumatic seat device, whereby the failure of one pump can be compensated for by a second pump and an increased functional reliably can thus be ensured.

It is particularly advantageous if the first functional unit and the further functional unit are formed by computing units, whereby mutual supervision of the individual computing units can be achieved. Moreover, the tasks and/or functions of one computing unit can also be undertaken and performed by a second computing unit. This ensures the functionality of the pneumatic seat device even in the event of disturbances or failure of a computing unit.

A first and at least one second functional unit are advantageously formed by sensor units, whereby a particularly efficient and redundant sensing of monitoring variables within the pneumatic seat device can be achieved. Thus, by way of example, in the case where a disturbance of a sensor unit is present, this can be identified and the tasks of this sensor unit can be undertaken by a second sensor unit. The sensor units can furthermore advantageously be arranged in distributed fashion, that is to say, in particular, at a distance from one another and/or in different housing units, with the result that particularly short reaction times can be realized.

It is furthermore proposed that the pneumatic seat device has at least one sensor unit for pressure sensing. A central and/or decentralized pressure supervision of the pneumatic seat device can be achieved by means of this sensor unit together with the computing unit. Furthermore, a fast and targeted pressure equalization between individual air chambers can advantageously be achieved.

In a further configuration, within a seat device comprising a pneumatic seat device and comprising a first and at least one second seat unit, the first functional unit is assigned to the first seat unit and the further functional unit is assigned to the second seat unit. A "seat unit" should be understood to mean a unit assigned respectively to a seat. By means of this arrangement it is possible to achieve an increased reliability in a row of seats comprising a plurality of seat units, since the functional units within the pneumatic seat device can undertake the tasks of structurally identical or functionally identical functional units in the event of disturbances or failure of a functional unit. This is particularly advantageous in seat devices in aircraft, with the result that a high degree of comfort can always be ensured, particularly in the case of long flight times.

BRIEF DESCRIPTION OF THE DRAWING

Further advantages will become apparent from the following description of the drawing in FIG. 1 which illustrates an exemplary embodiment of the invention. The drawing, the description and the claims contain numerous features in combination. A person skilled in the art will expediently consider the features individually as well and combine them to form practical further combinations.

DETAILED DESCRIPTION

FIG. 1 shows a schematic pneumatic seat device or an aircraft pneumatic seat device of an aircraft seat, which device comprises a central computing unit 14, a pump 30 and three pneumatic units 10.1, 10.2, 10.3. The central computing unit 14 has a central memory unit 24 and a processor (not illustrated in more specific detail here). The data exchange between the central computing unit 14, the pump 30 and the three pneumatic units 10.1, 10.2, 10.3 is effected via a data network equipped with a data bus 16. Moreover, the central computing unit 14, the pump 30 and the pneumatic units 10.1, 10.2, 10.3 are equipped with a respective data unit 18.1, 18.2, 18.3, 20, 42, which are provided for wireless reception and/or for wireless transfer of signals or data between the individual pneumatic units 10.1, 10.2, 10.3, the central computing unit 14 and the pump 30. Thus, in the event of failure or disturbance of the data network via the data bus 16 it is possible to configure the data exchange by means of radio signals, such that an efficient and reliable data transfer between the individual units of the pneumatic seat device is ensured at any time during operation of the pneumatic seat device. Instead of a data bus 16 or a data unit 18.1, 18.2, 18.3, 20, 42 for data exchange by means of radio signals, further configurations of the data network that appear practical to the person skilled in the art are possible depending on the arrangement of the pneumatic seat device. Moreover, the pneumatic seat device has a transfer unit 32 formed by a compressed air line, which transfer unit enables there to be transfer of air between the pump 30 and the pneumatic units 10.1, 10.2, 10.3 and also among the individual pneumatic units 10.1, 10.2, 10.3.

The individual pneumatic units 10.1, 10.2, 10.3 are arranged separately from one another and respectively have a dedicated decentralized computing unit 12.1, 12.2, 12.3 and a pneumatic cushion 34.1, 34.2, 34.3 with integrated sensor unit 26.1, 26.2, 26.3. The decentralized computing unit 12.1, 12.2, 12.3 is provided for controlling and/or regulating the pneumatic unit 10.1, 10.2, 10.3 having the respective computing unit 12.1, 12.2, 12.3. The number of pneumatic cushions 34.1, 34.2, 34.3 within a pneumatic unit 10.1, 10.2, 10.3 can be adapted in a variable manner to the seat requirements within the pneumatic seat device.

The decentralized computing units 12.1, 12.2, 12.3 respectively comprise a decentralized memory unit 22.1, 22.2, 22.3 and a decentralized processor (not illustrated in more specific detail here). The data bus enables not only the exchange of data of the decentralized computing units 12.1, 12.2, 12.3 with the central computing unit 14 but also the exchange of data of the decentralized computing units 12.1, 12.2, 12.3 among one another, such that a fast and flexible data exchange always takes place during operation of the pneumatic seat device. Connected to the decentralized computing units 12.1, 12.2, 12.3 are respectively a valve unit 36.1, 36.2, 36.3, and a further sensor unit 28.1, 28.2, 28.3, which are provided for fast regulation—independent of the central computing unit 14—of the pressure conditions in the pneumatic cushions 34.1, 34.2, 34.3.

The pneumatic cushions 34.1, 34.2, 34.3 each comprise two air chambers 38, 40 which can be inflated with air or evacuated separately from one another. In this case, the number of air chambers 38, 40 within a pneumatic unit 10.1, 10.2, 10.3 can be configured in variable fashion and be adapted to the seat requirements. Within the pneumatic units 10.1, 10.2, 10.3, by means of the sensor units 26.1, 26.2, 26.3, 28.1, 28.2, 28.3 in combination with the decentralized computing unit 12.1, 12.2, 12.3 and the valve units 36.1, 36.2, 36.3, fast decentralized pressure regulation in the pneumatic cushions 34.1, 34.2, 34.3 or in the air chambers 38, 40 is achieved in that air can be exchanged between in the individual air chambers 38, 40 via the transfer unit 32. Moreover, the pneumatic seat device is designed in such a way that between the pneumatic units 10.1, 10.2, 10.3, too, pressure regulation is possible in that air can be exchanged between the pneumatic cushions 34.1, 34.2, 34.3 of the pneumatic units 10.1, 10.2, 10.3 via the transfer unit 32. In this case, a fast local pressure monitoring in the individual pneumatic cushions 34.1, 34.2, 34.3 takes place by means of the sensor units 26.1, 26.2, 26.3, 28.1, 28.2, 28.3 together with the decentralized computing units 12.1, 12.2, 12.3. In this case, the pressure regulation between the individual pneumatic units 10.1, 10.2, 10.3 is regulated by the decentralized computing units 12.1, 12.2, 12.3, which always obtain information about the pressure conditions of all the pneumatic cushions 34.1, 34.2, 34.3 of the pneumatic seat device through the data bus 16. Moreover, by means of the central computing unit 14, too, the pressure and the air supply and/or air evacuation in the pneumatic cushions 34.1, 34.2, 34.3 can be regulated and, associated with this, it is possible to obtain supervision of the decentralized computing units 12.1, 12.2, 12.3 by the central computing unit 14 since the latter constantly exchanges data with all the units of the pneumatic seat device likewise by means of the data bus 16.

The individual valve units 36.1, 36.2, 36.3 are additionally coupled in each case to the three pneumatic cushions 34.1, 34.2, 34.3 by the transfer unit 32, formed by a compressed air line, and have six valve elements (not illustrated in more specific detail here) in a manner corresponding to the number of air chambers 38, 40 present in the pneumatic seat device. By means of the valve unit 36.1, 36.2, 36.3, which is controlled and/or regulated by the decentralized computing unit 12.1, 12.2, 12.3, it is thus possible to achieve the air supply and/or air evacuation of all the pneumatic cushions 34.1, 34.2, 34.3 of a pneumatic seat device and to ensure an associated functional reliability of the pneumatic seat device. Moreover, by means of the data exchange via the data bus 16 between the individual decentralized computing units 12.1, 12.2, 12.3 by way of example, the failure of the valve unit 36.1 can be detected and the function of said valve unit can be undertaken by one of the two further valve units 36.2, 36.3 by virtue of the valve unit receiving the requisite regulating and/or control signals from the computing units 12.1. This ensures regulated air supply or air evacuation of the respective pneumatic cushion 34.1, 34.2, 34.3 in the event of the failure of one of the valve units 36.1, 36.2, 36.3.

The double allocation of a pneumatic unit 10.1, 10.2, 10.3 with the sensor units 26.1, 28.1, 26.2, 28.2, 26.3, 28.3 provides mutual, redundant supervision of the pressure conditions in the pneumatic cushions 34.1, 34.2, 34.3. Moreover, by way of example, in the event of the failure of the sensor unit 26.1, the pressure supervision can furthermore be ensured by means of the sensor unit 28.1 of the pneumatic unit 10.1 in that the computing unit 12.1 identifies this on the basis of the signals obtained from the sensor units 26.1, 28.1 and, for pressure supervision, then resorts only to the signals of the sensor unit 28.1. Furthermore, each decentralized computing unit 12.1, 12.2, 12.3 is provided for driving all the sensor units 26.1, 28.1, 26.2, 28.2, 26.3, 28.3 and valve units 36.1, 36.2, 36.3 of the pneumatic seat device via the data bus 16. By means of the sensor units 26.1, 26.2, 26.3, 28.1, 28.2, 28.3, redundant pressure monitoring is provided between the individual pneumatic units 10.1, 10.2, 10.3 in that the pressure in the pneumatic cushions 34.1, 34.2, 34.3 of the entire pneumatic seat device can be monitored by means of the sensor units 26.1, 26.2, 26.3, 28.1, 28.2, 28.3 of a pneumatic unit 10.1, 10.2, 10.3, such that even in the event of the failure of both sensor units 26.1, 28.1, 26.2, 28.2, 26.3, 28.3 associated with a pneumatic unit 10.1, 10.2, 10.3, the functionality of the pneumatic unit 10.1, 10.2, 10.3 can be maintained.

In addition, it is possible for the tasks of the individual decentralized computing units 12.1, 12.2, 12.3 to be undertaken by another decentralized computing unit 12.1, 12.2, 12.3. Thus, by way of example, the decentralized computing units 12.2, 12.3 can undertake the tasks and functions of the decentralized computing unit 12.1, such that an increased and efficient functional reliability can be achieved within the pneumatic seat device.

The pneumatic seat device is part of a seat device comprising a plurality of substantially corresponding pneumatic seat devices. The seat device comprises a plurality of seat units formed by individual seats and has the central computing unit 14 and the central pump 30. Each seat unit (not illustrated in more specific detail in FIG. 1) comprises one of the pneumatic units 10.1, 10.2, 10.3, wherein the pneumatic cushions 34.1, 34.2, 34.3 are arranged in the region of a backrest and/or a seat base. The seat unit is operated by means of an input medium (not illustrated in more specific detail), for example an operating element, which is connected to the central computing unit 14 and the decentralized computing unit 12.1, 12.2, 12.3, coupled to the respective seat unit, via the data network. Consequently, in the event of the failure of a decentralized computing unit 12.1, 12.2, 12.3, the regulation of the seat units of a seat device can furthermore be ensured in that the central computing unit 14 undertakes the tasks and functions of the decentralized computing unit 12.1, 12.2, 12.3. Furthermore, the decentralized computing units 12.1, 12.2, 12.3 are provided for performing the tasks of the central computing unit 14 if the latter should fail.

The invention claimed is:

1. A pneumatic seat device for aircraft, comprising:
   a plurality of pneumatic units, wherein each pneumatic unit has at least one pneumatic cushion that has at least one air chamber that can be inflated with air;
   at least one computing unit of a first type;
   a plurality of computing units of a second type, which are assigned to the plurality of pneumatic units, respectively; and
   a data network comprising a data bus that
      provides for an exchange of data between the plurality of computing units of the second type and the at least one computing unit of the first type, and
      further provides for exchange of data among the plurality of computing units of the second type, wherein
   at least the plurality of computing units of the second type control air pressure in each of the plurality of pneumatic units.

2. The pneumatic seat device as claimed in claim 1, wherein
   the plurality of computing units of the second type are arranged with the at least one computing unit of the first type in distributed fashion.

3. The pneumatic seat device as claimed in claim 1, wherein
   at least one data unit is provided for wireless reception and/or for wireless transmission of data.

4. The pneumatic seat device as claimed in claim 1, wherein
   the at least one computing unit of the first type is a central computing unit, and the plurality of computing units of the second type are decentralized computing units.

5. The pneumatic seat device as claimed in claim 4, wherein the decentralized computing units each comprise a decentralized memory unit.

6. The pneumatic seat device as claimed in claim 4, wherein a valve unit and a sensor unit are connected to each of the decentralized computing units.

7. The pneumatic seat device as claimed in claim 1, further comprising
   at least two memory units.

8. The pneumatic seat device as claimed in claim 1, further comprising:
   a pump; and
   a transfer unit formed by a compressed air line, wherein the compressed air line enables there to be transfer of air between the pump and the plurality of pneumatic units and also among individual pneumatic units among the plurality of pneumatic units.

* * * * *